Jan. 3, 1967   G. G. KOLB   3,295,396
METHOD OF AND APPARATUS FOR MAKING CARBIDE TIPPED
SAW BLADE AND OTHER TOOLS
Filed Jan. 18, 1965   4 Sheets-Sheet 1

Inventor
Gerhard G. Kolb
By

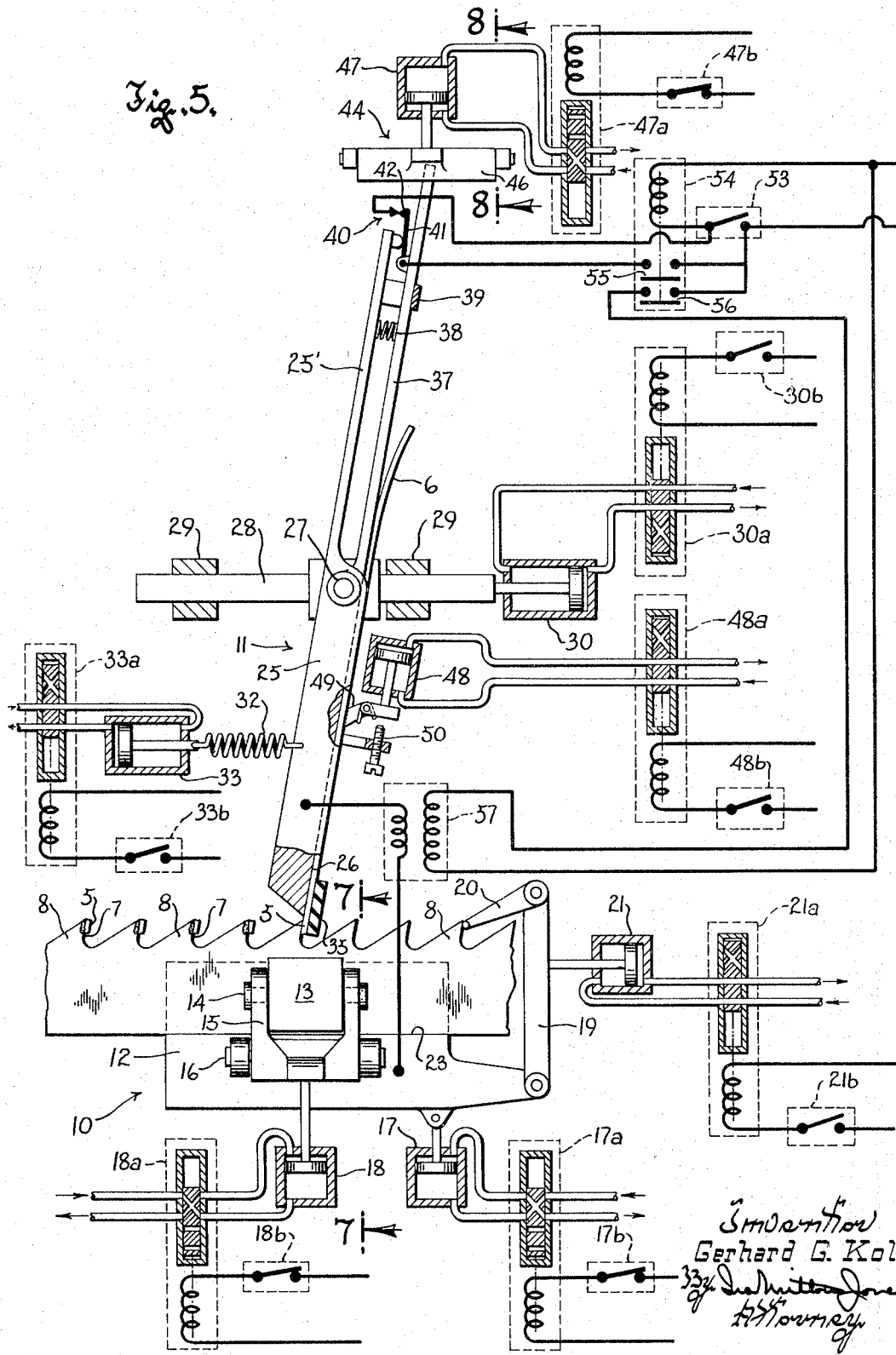

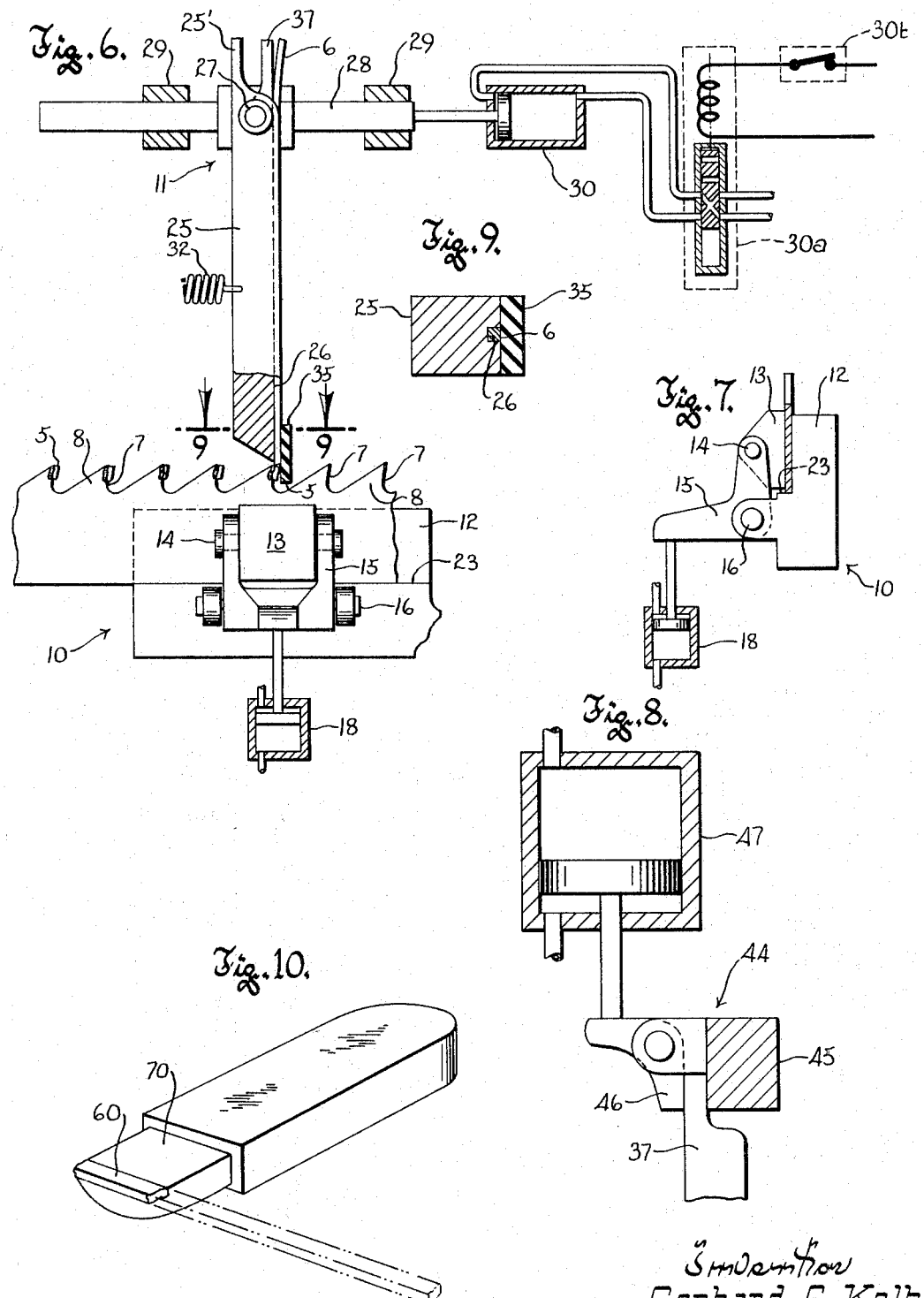

3,295,396
METHOD OF AND APPARATUS FOR MAKING CARBIDE TIPPED SAW BLADE AND OTHER TOOLS
Gerhard G. Kolb, Chicago, Ill., assignor to Contour Saws, Inc., Des Plaines, Ill., a corporation of Illinois
Filed Jan. 18, 1965, Ser. No. 426,025
8 Claims. (Cl. 76—25)

This invention relates to the manufacture of cutting tools and especially metal cutting band saws or blades.

In many respects the present invention may be said to be a projection or "carrying forward" of the invention forming the subject matter of the Anderson Patent No. 3,034,378, issued May 15, 1962, to the assignee of this invention. Everything said in that patent with respect to the desirability of a saw band or blade having extremely hard cutting teeth and a tough, fatigue resistant back or body, and with respect to the continuing efforts of the art to achieve this ultimate objective in a commercially economical and feasible manner, could be repeated here as a prelude to a description of this invention. It is felt, however, that the general background of this art is now so well understood that such repetition is not required, and if desired can be obtained by reference to the Anderson patent.

The purpose and object of this invention is simply to enable the practice of the method covered by the aforesaid Anderson patent in a more expeditious and economically practicable way.

In the method of the Anderson patent, a carbide rod is fed endwise against the face or front edge of the saw tooth and welded thereto by passing an electric welding current across the junction between the rod and the tooth. During the welding operation the portion of the tooth contiguous to the rod becomes heated to its fusion temperature and hence softens, but the carbide rod retains its form. Accordingly, pressure exerted on the rod forces the same into the adjacent portion of the tooth as the weld is formed. Upon cessation of welding current, the carbide rod is cut off a short distance from the face or front edge of the tooth by means of a thin diamond-edged cutting wheel. The welded-on end portion of the carbide rod is then dressed or shaped into the desired hard cutting tip for the tooth.

While the Anderson method of applying small bits of carbide to the tips of the saw teeth enabled the production of saw blades or bands of greatly improved quality and much closer to the desired ultimate than had ever before been attained, the need for cutting off the carbide rod with a diamond-edged cutting wheel or its equivalent limited the production rate. It also resulted in some loss of carbide due to the inevitable kerf formed by the cutoff wheel or saw as it cut through the rod.

This invention eliminates these disadvantages of the Anderson method, and in accomplishing its purpose not only enables more rapid production rates in the securement of carbide tips to individual saw teeth, but further improves production rates by making it entirely feasible and practicable to simultaneously attach carbide tips to a relatively large number of saw teeth. In other words, this invention is more amenable to mass production than the Anderson method.

While the present invention is especially concerned with the production of saw bands or blades, it is not limited thereto, but like the invention of the Anderson patent, is also useful in providing other metal cutting tools such as cutters for lathes, shapers and the like, with a very hard cutting edge.

With the above and other objects in view, this invention resides in the novel method described hereinafter and more particularly defined by the appended claims, and in the apparatus employed in the practice of the method, one embodiment of which is illustrated in the accompanying drawings, in which:

FIGURE 5 is a diagrammatic view of the apparatus used in the practice of the method, and illustrating the various elements of the apparatus in the positions they occupy at the instant just before the welding takes place, and when the carbide rod is positioned as shown in full lines in FIGURE 1;

FIGURE 6 is a view illustrating part of the structure shown in FIGURE 3, but with the elements thereof in the positions they occupy upon completion of the step in the method depicted in FIGURE 2;

FIGURE 7 is a cross sectional detail view through FIGURE 5 on the plane of the line 7—7;

FIGURE 8 is a cross sectional detail view through FIGURE 5 on the plane of the line 8—8;

FIGURE 9 is a cross sectional detail view through FIGURE 6 on the plane of the line 9—9; and FIGURE 10 is a perspective view of a cutter for use in a lathe or other machine tool, equipped with a hard metal cutting edge in accordance with this invention.

Figure 1:
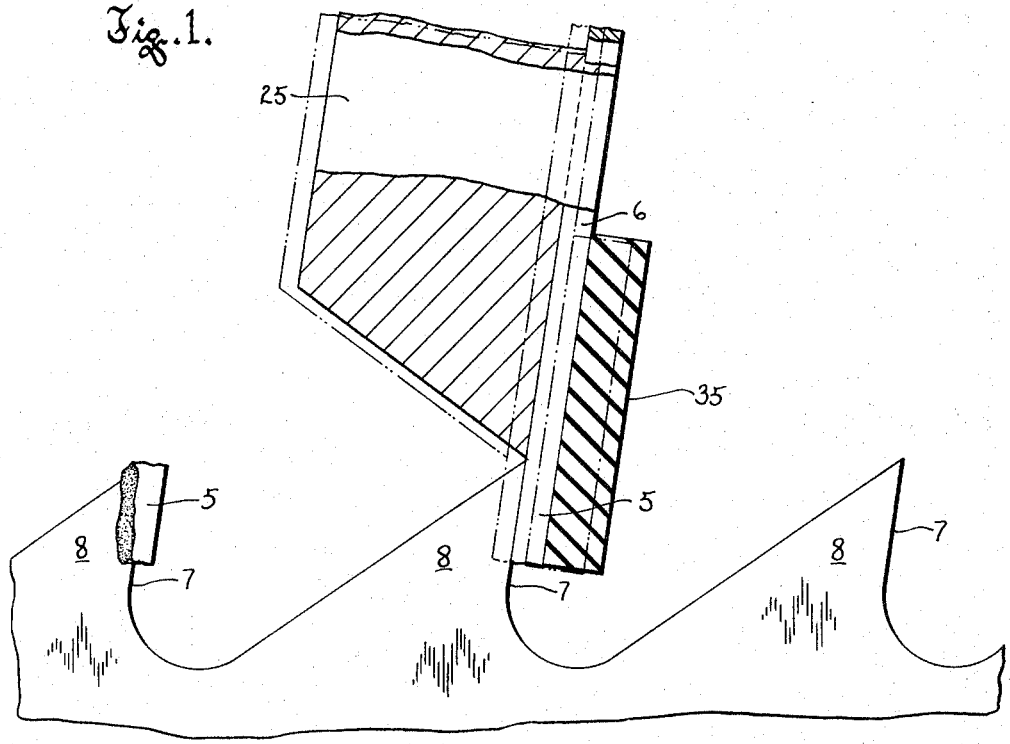
FIGURE 1 is a side view of a short section of a saw blade and depicts the first stages or steps in the method of providing its teeth with hard tips in accordance with this invention.
Figure 2:
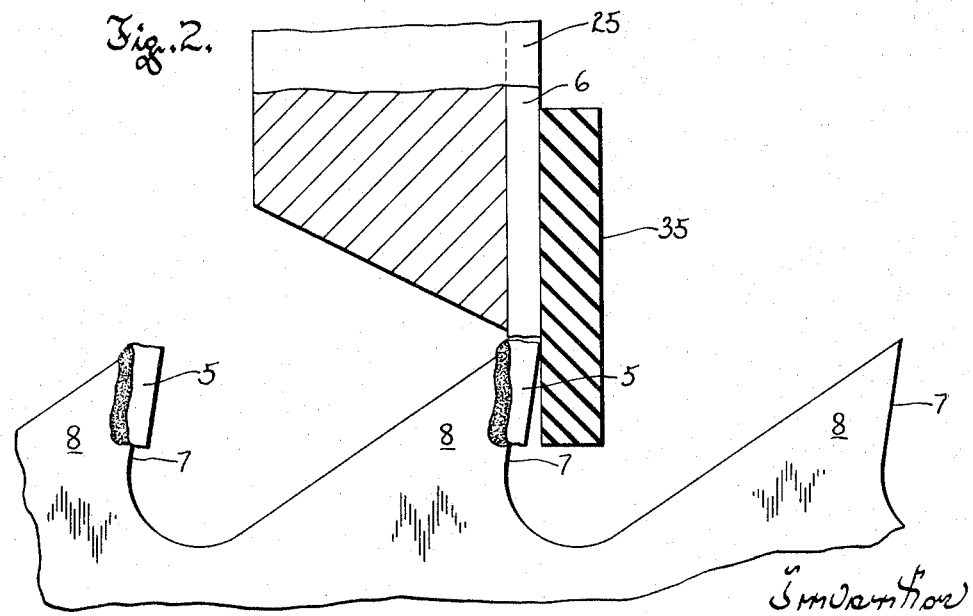
FIGURE 2 is a view similar to FIGURE 1, but showing the next step in the method.

In the method of this invention, and as shown in FIGURES 1 and 2, the end portion 5 of a carbide rod 6 is brought into contact with the face or front edge 7 of the steel saw tooth 8 by moving the rod laterally as distinguished from endwise, as in the Anderson method. One side of the carbide rod thus has flat surface-to-surface engagement with the face or front edge of the tooth for the full length of the end portion of the rod that is to be welded to the tooth. This permits the length of the welded-on carbide tip to be chosen without regard for the cross sectional size and shape of the rod, so that the rod may be square in cross section and no larger than the thickness of the saw blade. To illustrate, if the blade is thirty-two thousandths of an inch thick, the carbide rod need only be thirty-two thousandths of an inch square.

Since it is the side of the rod which contacts the face of the saw tooth, the rod should be disposed as shown in full lines in FIGURE 1 at the instant contact is first established between the rod and the saw tooth—namely, parallel to the face or front edge of the tooth and also to the flat sides of the saw blade. With the rod in contact with the saw tooth as described, and as shown in full lines in FIGURE 1, the end portion 5 of the rod is pressed against the saw tooth and an electric welding current is passed across the junction between the carbide rod and the tooth. This causes the part of the tooth contiguous to the carbide rod to become heated beyond its fusion temperature and the immediately adjacent portion of the saw tooth to be brought to its plastic deformation or forging temperature. Accordingly, the pressure exerted between the carbide rod and the saw tooth forces the end portion 5 of the carbide rod into the tooth, and as it does the resulting relative motion between the carbide rod and the saw tooth interrupts the welding current in a manner to be described. With the cessation of the flow of welding current the heated portion of the tooth begins to cool, but before it freezes the carbide rod will have been brought solidly against the portion of the tooth which was only at its plastic deformation or forging temperature.

As already pointed out, the relative motion between the carbide rod and the saw tooth, as the rod is forced into the saw tooth, and which motion is depicted in FIGURE 1 by the difference in location of the full line and dotted line positions of the carbide rod, is utilized in this invention to terminate the flow of welding current. Thus, by properly adjusting the force by which the carbide rod is pressed against the saw tooth, and by regulating the welding current, the depth of penetration of the carbide rod into the saw tooth can be predetermined, since it is this penetration itself which terminates the flow of welding current.

Carbide is, of course, a very hard and brittle material. It is possible, therefore, to break the carbide rod by bending it, even by bending it only slightly as shown in FIGURE 2. This is done by rocking the rod about the tip of the saw tooth toward the back of the tooth. The sharp bend which occurs as the rod is thus rocked, even through a relatively small angle, is sufficient to break the rod at a point directly outwardly of the tip of the saw tooth, as also shown in FIGURE 2. This completes the attachment of the carbide bit to one tooth, and as will be readily understood, the procedure is repeated for every tooth of the saw blade which is to be provided with a hard cutting point.

Figure 3:
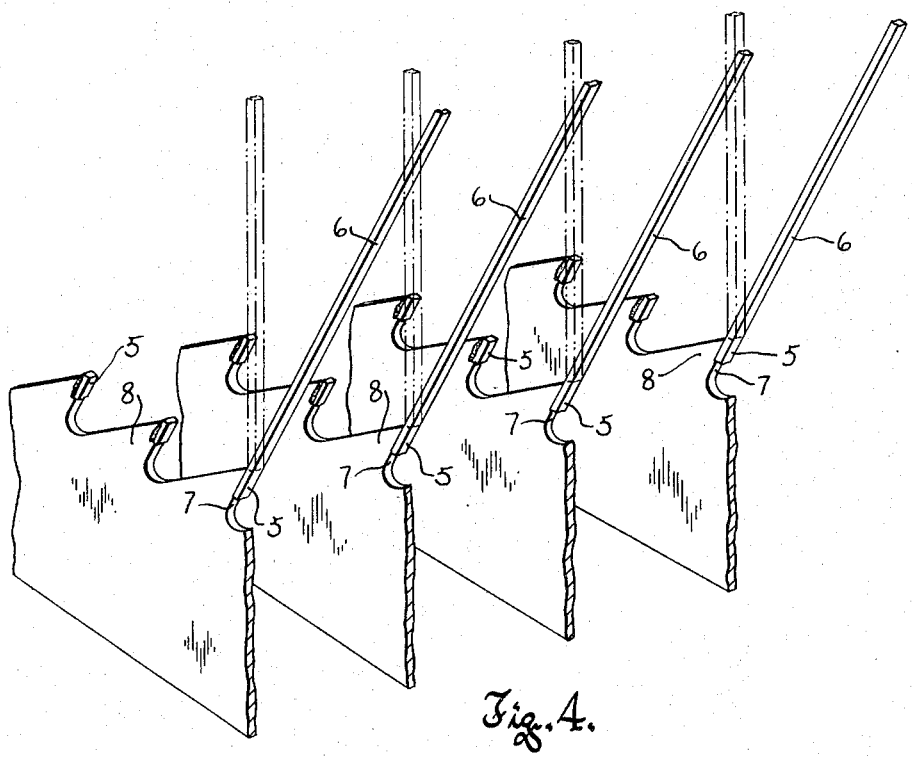
FIGURE 3 is a perspective view more or less diagrammatically illustrating one way in which the production rate can be increased by simultaneously applying carbide bits to saw teeth of the group of saw blades arranged side-by-side.
Figure 4:
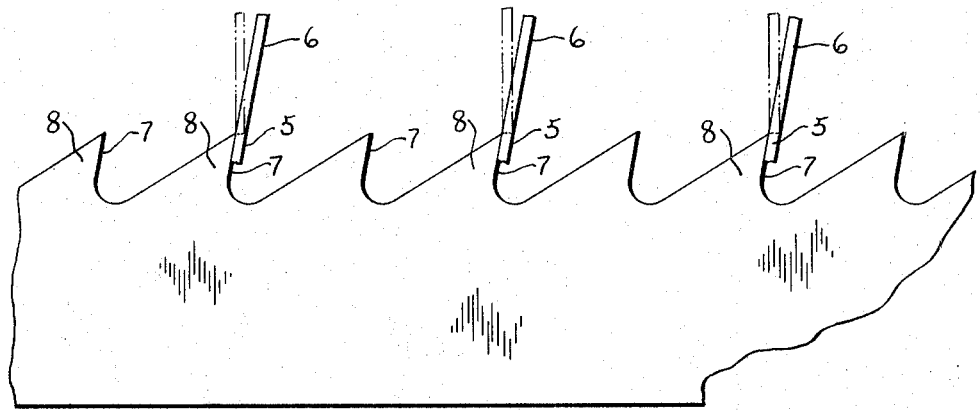
FIGURE 4 is a side view of a section of saw blade illustrating another way of increasing the production rate with this invention by simultaneously applying carbide tips to a number of teeth on the same blade.

By arranging a group of saw blades in side-by-side relationship, as shown in FIGURE 3, several saw teeth can be simultaneously provided with carbide tips in the manner described. Alternatively, as shown in FIGURE 4, a number of saw teeth on a single saw band or blade can have carbide tips applied thereto in the manner described. In the multiple blade method, the entire group of blades is advanced one tooth with each complete operation; in the other method, the saw blade is cyclically advanced a distance determined by the number of teeth to which carbide tips are applied at one time. In either case, relatively fast production rates can be achieved.

After all of the teeth of a saw band or blade which are to be equipped with hard cutting tips or points have been thus provided with welded-on bits of carbide, the welded-on bits of carbide are dressed or shaped into cutting tips for the teeth. This can be done in any conventional manner, and after the teeth have been set as required, the finished saw blade is heat treated to give it its desired spring temper.

As in the Anderson method, the steel used in the band or blade, and hence of course the teeth which are integral therewith, may be of any analysis which assures the desired resistance to fatigue failure and the ability to withstand shock. Steel identified as modified SAE 9260 has been found entirely suitable.

Also, as in the Anderson method, any conventional way of producing or forming the teeth on the saw band may be employed, but obviously the teeth must be formed or produced before the carbide can be welded thereto.

Throughout this specification and also in the appended claims, "carbide" is used as a generic term for tungsten carbide, with or without additives such as titanium carbide, boron carbide, tantalum carbide, cobalt and any other alloy having extreme hardness and the structure and properties of tungsten carbide. Hence, in construing this specification and the appended claims, the term "carbide" should be given this generic meaning.

Referring now particularly to FIGURES 5-8, inclusive, the apparatus employed in the practice of the method of this invention comprises a holder or fixture means 10 to grip and successively bring the teeth of the saw blade into a fixed position on the apparatus, in which position the blade is held while an end portion of the carbide rod is welded thereto. The apparatus also includes a holder or fixture means 11 by which the carbide rod is gripped and applied to the saw tooth at the welding station or position.

The fixture means 10 consists essentially of a pair of clamping jaws 12 and 13, the former providing the main body for the fixture means 10 and being movably mounted and guided in any suitable manner for translatory up and down movement. The other jaw 13 is pivoted, as at 14, to one arm of a bell-crank lever 15 which in turn is pivoted, as at 16, to the jaw 12. The positional relationship of these parts is such that by imparting counterclockwise torque to the bell-crank lever 15, as viewed in FIGURE 7, the jaw 13 will be forced toward the jaw 12 to solidly clamp or grip a saw band or blade received between the two jaws.

Translatory up and down motion may be imparted to the fixture means 10 by a hydraulic motor 17, and the clamping jaw 13 may be swung toward and from the jaw 12 by means of a similar hydraulic motor 18. When the saw band or blade in position in the fixture means 10 is not gripped by the jaws 12-13, it may be advanced to bring another tooth into position to have an end portion of the carbide rod welded thereto. This is done by an indexing lever 19 which is pivotally mounted on the jaw 12 and has a pawl 20 at its outer end to engage the face of an adjacent saw tooth. The indexing lever 19 is rocked forward and back by means of a hydraulic motor 21.

As best seen in FIGURE 7, the jaw 12 which, as noted, provides the body or main section of the fixture means 10, preferably has a ledge 23 upon which the back edge of the saw band or blade rests, it being understood that the elevation of this ledge will vary with the size and particularly the width of the saw band or blade so as to assure the saw teeth being at the proper elevation for cooperation with the fixture means 11 by which the end portion of the carbide rod is pressed against the saw teeth.

The fixture means 11 consists essentially of a rigid arm 25 having a groove 26 in one face thereof for the reception of the carbide rod 6 which is fed into the groove 26 in any suitable manner from a source of supply (not shown). The arm 25 is pivoted, as at 27 to a bar or rod 28 which is slidably mounted in bearings 29 for back and forth movement along an axis parallel to the ledge 23 of the fixture means 10. A hydraulic motor 30 provides means for shifting the bar or rod 28 back and forth, and a spring 32 connected between the arm 25 and the piston of a hydraulic motor 33 provides means for imparting force to the arm 25 tending to rock the same in a clockwise direction, as seen in FIGURES 5 and 6.

The lower end of the arm 25 adjacent to the fixture device 10 has a non-metallic and preferably ceramic block 35 fixed thereto and extending across the groove 26 to coact with the walls of the groove 26 and confine the lower end portion of the carbide rod against any motion with respect to the arm, other than endwise motion; and attention is directed to the fact that while the extremity of the arm 25 terminates above the tip of the adjacent saw tooth, the block 35 projects beyond the end of the arm and hence extends below the tip of the tooth, to provide solid support for the end portion 5 of the carbide rod. The counterclockwise torque applied to the arm 25 by the spring 32 acting through the block 35 thus presses the end portion of the carbide rod against the face or front edge of the adjacent saw tooth.

A switch arm 37 also mounted on the pivot 27, extends upwardly therefrom alongside the upper end portion 25' of the arm 25. A compression spring 38 confined between the switch arm and the upper end 25' of the arm 25 yieldingly holds the two apart a distance defined by a stop 39 carried by the upper end of the arm 25'.

Located between the switch arm 37 and the arm 25' is a control switch 40, diagrammatically illustrated in FIGURE 5 but which, in practice, would be in the form of a sensitive micro-type switch. As illustrated, the switch 40 has a movable contactor 41 and a contact 42, both carried by the switch arm 37, while the outer end of the arm 25' has an abutment or button to press against the contactor to open the switch upon movement of the arm 25' towards the switch arm 37. Such movement, as will be hereinafter explained, takes place during the welding operation as a result of the end portion of the carbide rod being driven or forced into the softened metal of the saw tooth; and to enable such motion to take place, the outer end of the switch arm 37 is releasably gripped by a clamping device 44 comprising a stationary member 45 and a clamping jaw 46 pivotally or hingedly connected thereto. A hydraulic motor 47 provides means for actuating the clamping device 44 to grip the switch arm 37.

With each operation or cycle of the apparatus, it is of course necessary that the carbide rod 6 be advanced or fed forwardly an amount determined by the length of the carbide tip to be applied to each saw tooth. Any suitable mechanism may be employed for this purpose. In the structure illustrated, a fluid motor 48 acting through a unidirectional clutch device 49 effects the desired advance of the carbide rod. Since the distance the carbide rod is advanced or fed forward with each cycle should be accurately determined, an adjustable stop device 50 is preferably provided to limit the advance of the clutch device 49 by its fluid motor 48.

Each of the fluid motors by which the various elements of the apparatus are actuated is controlled by a solenoid actuated valve, and for sake of convenience these valves are identified by the same reference numerals used to designate the various fluid motors, but with the added suffix "a." Thus, for instance, the hydraulic motor 17 is controlled by a solenoid actuated control valve 17a, the fluid motor 18 is controlled by solenoid actuated valve 18a, and so forth. The solenoids which actuate the various valves are of course energized by the closure of their respective circuits which, in practice, is effected automatically, but for the sake of simplicity in the present disclosure, manual switches 17b, 18b and so forth are provided for this purpose.

The operation of the illustrated apparatus in the performance of the method of this invention will now be described, reference of course being had to FIGURES 5–9, inclusive, and particularly to FIGURE 5.

FIGURE 5 illustrates the apparatus or system at that point in the cycle directly preceding the beginning of the actual welding step. Hence, the fixture means 10 has been elevated by actuation of its fluid motor 17 to its operative position positioning one of the teeth of the saw blade at the welding location or station directly adjacent to the lower end of the arm 25. The blade is solidly gripped and held in this position by the jaws 12–13 which have been closed by the fluid motor 18.

The fluid motor 33 has been actuated to tension the spring 32 and thereby pull the arm 25 to the left, as seen in FIGURE 5. This causes the ceramic pressure shoe or block 35 to press the lower end portion of the carbide rod against the face or front edge of the saw tooth at the welding position or location. The pivot 27 about which the arm 25 swings is held against shifting and in its farthest right position by the fluid motor 30, and the outer end of the switch arm 37 is clamped by the clamping device 44.

At this point in the cycle, the switch 40 is closed, but there is no welding current flowing across the junction between the carbide rod and the saw tooth. This does not take place until a switch 53 is closed. With the closure of this switch 53, a solenoid 54 is energized to close switches 55 and 56, the former being in parallel with the switch 53 and in series with the switch 40. Hence, despite the fact that the switch 53 is closed only momentarily, the energizing circuit for the solenoid 54 will be maintained until the switch 40 opens.

Closure of the switch 56 energizes the primary of a transformer 57, the secondary of which provides the welding current and has its opposite ends connected with the arm 25 and the fixture device 10, so that upon energization of the transformer 57 current flows across the junction between the carbide rod and the saw tooth. With the passage of welding current across the junction between the rod and saw tooth, the portion of the tooth which is contiguous to the carbide rod is quickly heated to its fushion temperature, and the immediately adjacent portion of the tooth is brought to its plastic deformation or forging temperature.

It should be noted that during the welding operation pressure is maintained between the carbide rod and the steel tooth by the force of the spring 32, and that it is the ceramic block 35 which applies this pressure on the rod. The thermal insulation provided by the ceramic block prevents welding the carbide rod to its holding fixture.

As the welding current flows across the junction between the carbide rod and the steel tooth, the steel is quickly brought to its fusion temperature and softens to the point of fluidity so that the pressure on the carbide rod forces it into the tooth and solidly against the adjacent portion of this steel which is only at its plastic deformation or forging temperature. As this penetration of the carbide into the steel takes place, there is of course relative movement between the carbide rod and the tooth, and this movement rocks the arm 25 about its pivot 27 in the direction to swing its upper end portion 25' towards the switch arm 37 to thereby open the switch 40. With the opening of the switch 40, the solenoid 54 and the welding transformer are de-energized to terminate the flow of welding current.

The clamping device 44 is now actuated to release its grip upon the switch arm 37, this being done by closure of the switch 47b and the consequent shifting of the spool of the valve 47a.

When the clamping device 44 has released its grip upon the switch arm 37, the slide bar 28 may be shifted to the left by its fluid motor 30 in consequence of closure of its associated switch 30b. This action rocks the carbide rod about the tip of the saw tooth and, in so doing, bends and breaks the carbide rod at a point directly outwardly of the top of the saw tooth, as shown in FIGURES 2 and 6.

This completes the securement of a carbide tip to one tooth. The fixture device 10 must now be retracted from its operative position, and this is done by actuation of its fluid motor 17 in response to closure of switch 17b. Also the fixture device 10 must release its grip upon the saw, which is done by actuation of the fluid motor 18. The saw blade can now be advanced to bring the next tooth into welding position, which is done by actuation of the fluid motor 21 acting through the indexing lever 19.

The arm 25 is now returned to its initial position shown in FIGURE 5, by actuation of the fluid motor 30, and the carbide rod is advanced the appropriate distance by actuation of the fluid motor 48. Thereupon, the clamping device 44 is activated to again grip the switch arm 37, and the apparatus is again in the condition shown in FIGURE 5, ready for the next welding operation.

As explained hereinbefore, and as indicated diagrammatically in FIGURES 3 and 4, the invention lends itself admirably to significantly increased production rates. Any practical number of welding heads can be arranged side-by-side as indicated in FIGURE 3; or in tandem, as shown by FIGURE 4; or, if desired, groups of side-by-side welding heads may be arranged in tandem, in which case a combination of procedures diagrammatically illustrated in FIGURES 3 and 4 would be possible.

Although this invention is primarily concerned with the production of saw blades, it will be understood by those skilled in the art that the invention may be used to advantage in conjunction with other cutting tools. For instance, the cutters customarily used in lathes, shapers, boring mills, etc., would be improved if they had carbide tips welded thereto in accordance with this invention, and in FIGURE 10 there is illustrated a cutter for use in a lathe or shaper having a carbide tip 60 fused or welded to a steel shank 70. Obviously, of course, the apparatus used in the securement of the tip 60 would have to differ from that shown and described herein, but essentially the procedure involved in its attachment and formation would be the same.

From the foregoing description taken in connection with the accompanying drawings, it will be apparent that this invention provides a substantial improvement upon the method covered by the aforesaid Anderson Patent No. 3,034,378, notably because it eliminates the need for the diamond wheel cutoff operation, and hence is faster, and because it lends itself better to simultaneous multiple securement of carbide tips. Another advantage which this invention possesses over the Anderson patent is that it accommodates closer tooth spacing, and steeper positive rake angles on the cutting face of the tooth.

It will also be understood that the apparatus which is more or less diagrammatically illustrated in the drawing, is susceptible to considerable modification without deviating from the scope of this invention as defined by the appended claims.

What is claimed as my invention is:

1. A method of forming a hard cutting edge on a tool formed of metal possessing the properties necessary to withstand shock, which comprises:
   A. pressing an end portion of a rod of metal much harder than that of which the tool is formed, laterally against the tool where the cutting edge is to be located;
   B. welding said end portion of the rod to the tool;
   C. rocking the rod with respect to the tool and the welded-on end portion of the rod, to bend the rod at a point directly outwardly of its welded-on end portion and thereby break the rod at said point; and
   D. shaping the welded-on end portion of the rod into a cutting edge for the tool.

2. A method of providing hard cutting points for the teeth of a saw, which comprises:
   A. pressing an end portion of a rod of very hard metal laterally against the face of each tooth to be provided with a hard cutting point, with the rod extending outwardly of the tooth and substantially parallel to its face and sides;
   B. welding the end portion of the rod to the tooth;
   C. rocking the rod about the top of the tooth and towards the back of the tooth to thereby break the rod close to the tip of the tooth; and
   D. shaping the welded-on end portion of the rod into a cutting point for the tooth.

3. A method of forming a hard cutting edge on a tool as set forth in claim 1,
   wherein the welding is done electrically and requires the closure of a circuit;
   wherein the rise in temperature at that part of the tool contiguous to the end portion of the rod incident to the welding causes said part of the tool to soften; and
   wherein the pressure by which the end portion of the rod is pressed against the tool forces said end portion into the softened part of the tool and in so doing effects movement of the rod with respect to the tool;
   and utilizing said movement of the rod with respect to the tool to open said circuit and terminate the welding.

4. A method of providing hard cutting points for the teeth of a saw, as set forth in claim 2,
   wherein the welding is done electrically and begins with closure of a circuit and terminates with opening of said circuit;
   wherein the rise in temperature of that part of the tooth contiguous to the end portion of the rod incident to the welding causes said part of the tooth to soften; and
   wherein the pressure of the end portion of the rod against the face of the tooth forces said end portion of the rod into the softened part of the tooth and in so doing effects movement of the rod with respect to the tooth;
   and utilizing said movement of the rod with respect to the tooth to open said circuit.

5. A method of providing hard cutting points for the teeth of a saw formed of steel which comprises:
   A. holding the saw stationary;
   B. placing a carbide rod in juxtaposition to a tooth of the saw with one end portion of the rod contiguous to the face of the tooth and the rod substantially parallel to the face and sides of the tooth;
   C. pressing the end portion of the carbide rod and the face of the steel saw tooth together;
   D. passing an electric welding current across the junction between the carbide rod and the steel saw tooth;
   E. maintaining the pressure between the end portion of the carbide rod and the steel saw tooth to cause the rod to penetrate into the steel saw tooth as the portion thereof contiguous to the carbide rod attains its fusion temperature;
   F. utilizing the movement of the rod with respect to the saw tooth as the rod penetrates into the tooth to actuate a switch and terminate the passage of electric welding current across the junction between the carbide rod and the steel saw tooth;
   G. rocking the carbide rod about the tip of the saw tooth towards the back of the tooth, thereby bend and break the carbide rod directly outwardly of its welded-on end portion; and
   H. shaping the welded-on end portion of the carbide rod into a cutting point for the saw tooth.

6. A method of providing a hard cutting point for a tool formed of steel possessing the properties necessary to withstand shock and have good resistance to fatigue failure, which comprises:
   A. simultaneously electric welding an end portion of a carbide rod to the tool where the cutting point is to be located and forcing said end portion of the rod into the tool, by passing a welding current across the junction between the carbide rod and the steel tool and pressing the end portion of the rod and the tool towards one another so that as the contiguous portion of the tool is softened by the rise in temperature thereat, the end portion of the rod displaces some of the softened metal of the tool and seats itself in the tool;
   B. utilizing the relative movement between the carbide rod and the tool as the end portion of the rod enters the tool, to actuate an electric switching device and thereby interrupt the flow of welding current across the junction between the carbide rod and the tool;
   C. breaking the rod directly outwardly of its welded-on end portion; and
   D. shaping the welded-on end portion of the rod into a cutting point for the tool.

7. Apparatus for providing a tool formed of metal having good shock resistant properties with a hard cutting edge, comprising:
   A. first fixture means for gripping and holding the tool, and having means to so position the tool that the portion thereof at which the hard cutting edge is to be located is exposed and at a fixed location;
   B. second fixture means for gripping and holding a rod of hard metal with one side of one end portion of the rod exposed;
   C. a pressure applying member on said second fixture means to bear against the opposite side of said end portion of the rod;
   D. means mounting said two fixture means and so positioning them that said pressure applying member is in juxtaposition to said fixed location and is operable to press the exposed side of the end portion of the rod against the tool;

E. motion producing means operatively associated with one of said fixture means for effecting relative movement between said two fixture means in the direction to bring the exposed side of the end portion of the rod into contact with the exposed portion of the tool and to cause said pressure applying member to press the end portion of the rod against the tool;

F. means for passing an electric welding current across the junction between the tool and the rod to cause softening of the contiguous portion of the tool and fusion of the end portion of the rod to the tool, the softening of the contiguous portion of the tool enabling further relative movement between the two fixture means to force the end portion of the rod into the tool; and G. means responsive to such further relative movement between the two fixture means to stop the flow of electric welding current across the junction between the tool and the rod.

8. The apparatus of claim 7, further characterized by: motion producing means operatively associated with with one of the fixture means to effect relative rocking movement between said two fixture means about an axis contiguous to the outer extremity of the exposed portion of the tool, to thereby bend and break the rod at said point.

No references cited.

GRANVILLE Y. CUSTER, Jr., *Primary Examiner.*